United States Patent
Kurd

(10) Patent No.: US 10,346,165 B2
(45) Date of Patent: Jul. 9, 2019

(54) RESOURCE LOCKING FOR LOAD STORE SCHEDULING IN A VLIW PROCESSOR

(71) Applicant: Avago Technologies International Sales Pte. Limited, Singapore (SG)

(72) Inventor: Tariq Kurd, Bishopston (GB)

(73) Assignee: Avago Technologies International Sales Pte. Limited, Singapore (SG)

( * ) Notice: Subject to any disclaimer, the term of this patent is extended or adjusted under 35 U.S.C. 154(b) by 316 days.

(21) Appl. No.: 14/530,117

(22) Filed: Oct. 31, 2014

(65) Prior Publication Data

US 2015/0309793 A1    Oct. 29, 2015

Related U.S. Application Data

(60) Provisional application No. 61/984,710, filed on Apr. 25, 2014, provisional application No. 61/984,709, filed on Apr. 25, 2014, provisional application No. 61/984,711, filed on Apr. 25, 2014, provisional application No. 61/984,706, filed on Apr. 25, 2014, provisional application No. 61/984,708, filed on Apr. 25, 2014, provisional application No. 61/984,707, filed on Apr. 25, 2014.

(51) Int. Cl.
*G06F 9/30* (2018.01)

(52) U.S. Cl.
CPC ...... *G06F 9/30043* (2013.01); *G06F 9/30145* (2013.01); *G06F 9/30181* (2013.01)

(58) Field of Classification Search
CPC .................................................. G06F 9/3838
See application file for complete search history.

(56) References Cited

U.S. PATENT DOCUMENTS

| 6,065,105 A * | 5/2000 | Zaidi | G06F 9/3836 712/215 |
| 6,622,235 B1 * | 9/2003 | Keller | G06F 9/3836 712/214 |
| 6,691,223 B1 | 2/2004 | Ganesan et al. | |
| 8,918,625 B1 | 12/2014 | O'Bleness et al. | |
| 2009/0157944 A1 | 6/2009 | Robinson | |
| 2010/0205609 A1 * | 8/2010 | Cypher | G06F 9/3842 718/105 |

(Continued)

OTHER PUBLICATIONS

Fernando Castro, Daniel Chaver, Luis Pinuel, Manuel Prieto, Francisco Tirado, Michael Huang. "Load-Store Queue Management: an Energy-Efficient Design Based on a State-Filtering Mechanism" Proceedings of the 2005 International Conference on Computer Design (ICCD'05).*

(Continued)

*Primary Examiner* — Jacob Petranek
(74) *Attorney, Agent, or Firm* — Sterne, Kessler, Goldstein & Fox P.L.L.C.

(57) ABSTRACT

A load/store unit including a memory queue configured to store a plurality of memory instructions and state information indicating whether each memory instruction of the plurality of memory instructions can be performed independently, with, separately, or after older pending instructions; and a state-selection circuit configured to set a state information of each memory instruction of the plurality of memory instructions in view of an older pending instruction in the memory queue.

35 Claims, 4 Drawing Sheets

(56) References Cited

U.S. PATENT DOCUMENTS

| | | | |
|---|---|---|---|
| 2010/0250900 A1* | 9/2010 | Brown | G06F 9/3814 |
| | | | 712/208 |
| 2010/0257341 A1* | 10/2010 | Brown | G06F 9/3838 |
| | | | 712/216 |
| 2010/0332806 A1* | 12/2010 | Golla | G06F 9/3838 |
| | | | 712/216 |
| 2014/0108862 A1* | 4/2014 | Rafacz | G06F 9/3826 |
| | | | 714/15 |
| 2014/0129806 A1* | 5/2014 | Kaplan | G06F 9/3824 |
| | | | 712/220 |
| 2014/0310500 A1* | 10/2014 | Kaplan | G06F 12/1009 |
| | | | 711/206 |
| 2014/0351562 A1 | 11/2014 | Spadini | |
| 2014/0380024 A1* | 12/2014 | Spadini | G06F 9/3834 |
| | | | 712/217 |
| 2015/0309798 A1 | 10/2015 | Kurd et al. | |

OTHER PUBLICATIONS

Non-Final Office Action, dated Apr. 21, 2017, in U.S. Appl. No. 14/530,104, filed Oct. 31, 2014, 23 pages.
Final Office Action, dated Oct. 13, 2017, in U.S. Appl. No. 14/530,104, filed Oct. 31, 2014, 16 pages.

* cited by examiner

RESOURCE LOCKING FOR LOAD STORE SCHEDULING IN A VLIW PROCESSOR

CROSS REFERENCE TO RELATED APPLICATIONS

This application claims the benefit of U.S. Provisional Patent Application No. 61/984,706, filed Apr. 25, 2014, U.S. Patent Appl. No. 61/984,707, filed Apr. 25, 2014, U.S. Patent Appl. No. 61/984,708, filed Apr. 25, 2014, U.S. Patent Appl. No. 61/984,709, filed Apr. 25, 2014, U.S. Patent Appl. No. 61/984,710, filed Apr. 25, 2014, and U.S. Patent Appl. No. 61/984,711, filed Apr. 25, 2014. Each of the listed applications are incorporated herein by reference in their entireties.

FIELD OF THE DISCLOSURE

The present disclosure relates generally to computer processors.

BACKGROUND

Advances in semiconductor manufacturing have made it possible to incorporate large amounts of logic circuitry on an integrated circuit. In turn, this has led to advances in digital systems architecture. One particular area of digital systems architecture that has benefited greatly from the capability to include vast arrays of logic circuitry on a single integrated circuit is processor design.

BRIEF DESCRIPTION OF THE DRAWINGS

Embodiments are described with reference to the accompanying drawings. In the drawings, like reference numbers indicate identical or functionally similar elements. Additionally, the left most digit(s) of a reference number identifies the drawing in which the reference number first appears.

FIGS. 1 and 2 illustrates various components, their arrangements, and interconnections, and is not drawn to scale.

DETAILED DESCRIPTION

Figure 1:
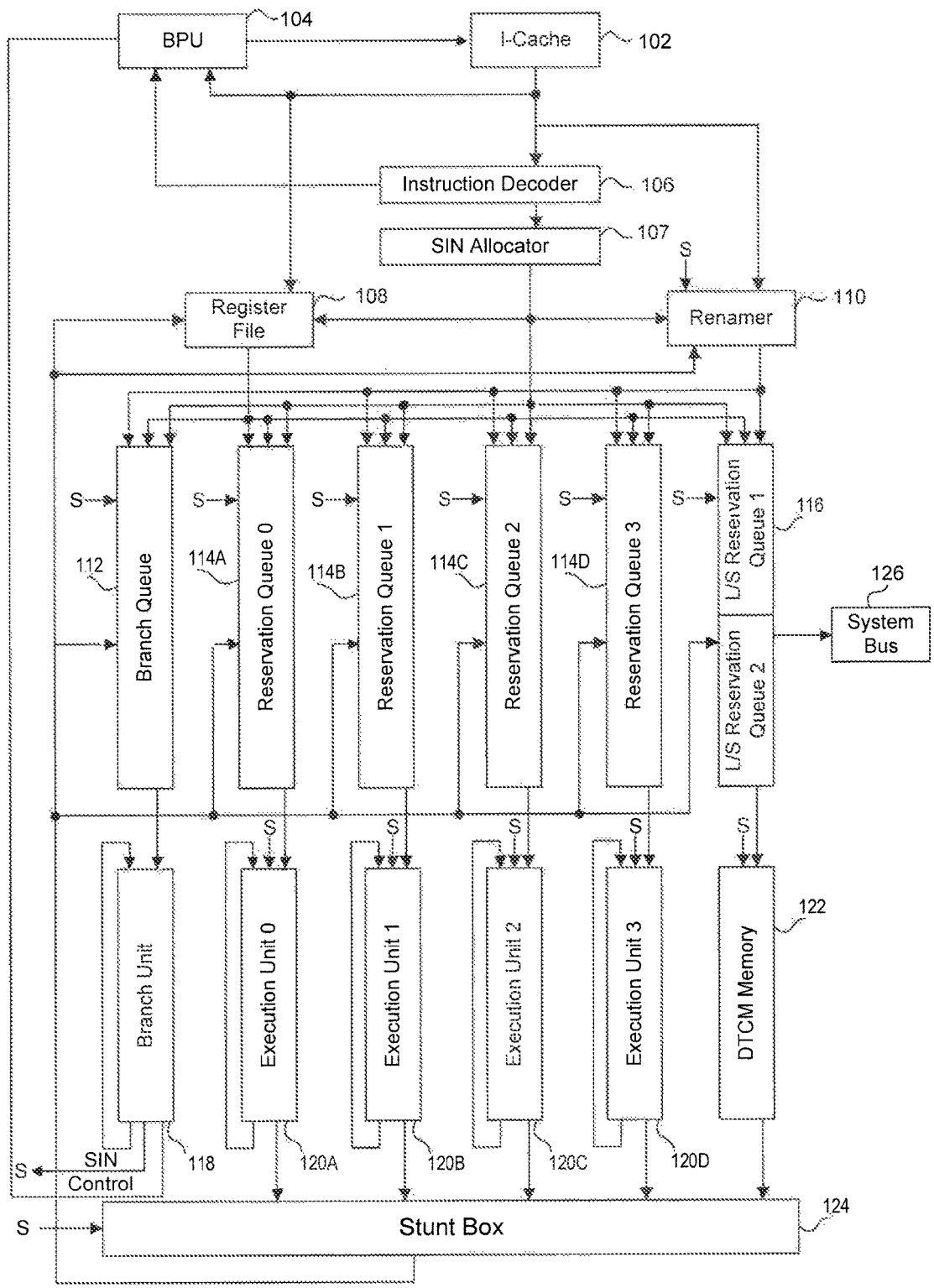
FIG. 1 is a high-level block diagram of an exemplary processor.

The following Detailed Description refers to accompanying drawings to illustrate exemplary embodiments. References in the Detailed Description to "one exemplary embodiment," "an illustrative embodiment", "an exemplary embodiment," and so on, indicate that the exemplary embodiment described may include a particular feature, structure, or characteristic, but every exemplary embodiment may not necessarily include the particular feature, structure, or characteristic. Moreover, such phrases are not necessarily referring to the same exemplary embodiment. Further, when a particular feature, structure, or characteristic is described in connection with an exemplary embodiment, it is within the knowledge of those skilled in the relevant art(s) to affect such feature, structure, or characteristic in connection with other exemplary embodiments whether or not explicitly described.

The exemplary embodiments described herein are provided for illustrative purposes, and are not limiting. Other exemplary embodiments are possible, and modifications may be made to the exemplary embodiments within the spirit and scope of the disclosure.

It is to be understood that the phraseology or terminology herein is for the purpose of description and not of limitation, such that the terminology or phraseology of the present specification is to be interpreted by those skilled in relevant art(s) in light of the teachings herein.

Terminology

The terms, chip, die, integrated circuit, semiconductor device, and microelectronic device, are often used interchangeably in the field of electronics. The present disclosure is applicable to all the above as these terms are generally understood in the field.

FET, as used herein, refers to metal-oxide-semiconductor field effect transistors (MOSFETs). An n-channel FET is referred to herein as an NFET. A p-channel FET is referred to herein as a PFET.

CMOS refers to a semiconductor manufacturing process in which both NFETs are PFETs are formed in an integrated circuit.

CMOS circuit refers to a circuit in which both NFETs and PFETs are used together.

VLIW is an acronym for Very Long Instruction Word.

VLIW instruction, as used in the description of exemplary embodiments herein, refers to a set of instructions grouped together for presentation to the instruction decoder. The individual instructions in the set of instructions are assigned to one of a plurality of execution pipes for execution.

IC0 refers to a pseudo-stage which is on the input to the instruction cache.

IC1 refers to the instruction cache stage. Fetch requests to the instruction cache are made in this cycle, along with calculations to determine which PC to fetch next. VLIW instructions previously requested are supplied in this stage.

DE1 refers to the first stage of the instruction decoder.

DE1_operation refers to a logical operation performed by the first stage of the instruction decoder.

DE1_time refers to a cycle in which a DE_1 operation occurs.

DE2 refers to the second stage of the instruction decoder.

DE2_operation refers to a logical operation performed by the second stage of the instruction decoder.

DE2_time refers to the cycle in which the reading and renaming of the general register file (GRF) and predicate register file (PREG) occurs.

RS refers to a reservation station. There are several different reservation stations that can be enqueued to. In the best case this is a single cycle stage, however operations may end up queuing here for many cycles.

EXn refers to an nth stage of an execution pipe. Examples of execution pipes include ALU short and long pipes, BRANCH and the Load Store Unit.

SHP refers to a short execution pipe. A short execution pipe is used to perform single cycle operations.

LOP refers to a long execution pipe. A long execution pipe is used to execute instructions that take 2-8 cycles to complete.

LSU refers to the load store unit.

DTCM refers to a data tightly coupled memory.

PBUS refers to a bus that connects to a peripheral memory.

DCACHE refers to the data cache used to cache accesses to peripheral memory.

Enqueue refers to the action in which a VLIW instruction in DE2 is split into its component operations and then move forward down the pipe into the reservation stations.

Issue refers to moving an operation from the reservation station to an execution unit. An operation is referred to as being issued when it is moved from the reservation station to an execution unit. An operation is a component pan of a VLIW instruction.

Current PC refers to the value of the program counter (PC) for the instruction currently in a given stage. Each stage of the pipe will have its own version of the current PC.

Next PC refers to the next PC to fetch from the Icache. For straight line code this will be current PC+current instruction width, for redirected code it will be the new target PC.

Loop start address refers to the address of the first instruction in a loop body, i.e., the address to branch to for starting a new loop iteration.

Loop end address refers to the address of the first instruction after a loop body, i.e., the address to branch to for naturally exiting the loop.

Loop body refers to the instructions beginning with the loop start address and ending with the loop match address.

Loop match address refers to the address of the last instruction in a loop body.

Loop count refers to the number of iterations of the loop that should be executed. This comes from either an immediate field for LOOP operations, or a general register for ZLOOP and ZLOOPS operations.

SIN refers to the Speculation Index Number, which is used to identify instructions enqueued speculatively in the shadow of a branch.

SIN resolution refers to determining whether a branch was correctly speculated or not. SIN resolution is performed in EX1.

SIN validation refers to a branch in EX1 that was correctly speculated, which in turn will validate the SIN associated with the operations in the shadow of the correctly speculated branch. A validated operation is one which will update the architectural state.

SIN cancellation refers to a branch in EX1 that was incorrectly speculated, which in turn will cancel all outstanding SINs, and perform an EX1 redirect, effectively removing all operations that were in the shadow of the branch it from the execution pipe. In one embodiment, removing the operation that were in the shadow of the incorrectly speculated branch includes changing the state of a bit associated with each of those instruction in the execution pipe.

State coherency enforcement (SCE) refers to actions performed by an internal mechanism to prevent future operations from seeing an incoherent machine state.

Trap events refers to the set of synchronous, asynchronous and fault events.

Synchronous trap events relate to a specific instruction and are detected in time to prevent the instruction causing the event from being enqueued. The Supervisor Call (SVC) instruction fits into this category. These are precise as they occur in an architecturally defined place in the instruction stream.

Asynchronous trap events (interrupts) occur independently from the current instruction sequence. Asynchronous exceptions fit into this.

Fault trap events prevent program flow from recovering. Examples of fault trap events are a misaligned PC and a data abort. Faulting operations with a register destination must complete a register value.

A processor architecture is disclosed that includes a register file having a plurality of registers, and is configured for out-of-order instruction execution, further includes a renamer unit that produces generation numbers that are associated with register file addresses to provide a renamed version of a register that is temporally offset from an existing version of that register rather than assigning a non-programmer-visible physical register as the renamed register. The processor architecture includes a small reset DHL Gshare branch prediction unit coupled to an instruction cache and configured to provide speculative addresses to the instruction cache. The processor architecture is suitable for implementation in an integrated circuit. Such an integrated circuit is typically implemented with CMOS circuitry.

In typical embodiments a processor in accordance with this disclosure is implemented in an integrated circuits as an embedded processor.

FIG. 1 is a high-level block diagram illustrating the major blocks of an exemplary processor in accordance with the disclosure. The exemplary processor includes an instruction cache 102 coupled to receive a VLIW instruction address from a branch prediction unit 104, and further coupled to provide an output to branch prediction unit 104, an instruction decoder 106, a register file 108, and a generation renamer 110. Generation renamer 110 is coupled to branch execution unit 118 to receive a SIN control signal, coupled to the SIN Allocator to receive a SIN number, coupled to a stunt box 124 to receive an output from an operand copy network, and coupled to the branch reservation queue 112, execution pipe reservation queues 114A, 114B, 114C, 114D, and load/store reservation queue 116. Register file 108 is coupled to stunt box 124 to receive input from the operand copy network, and is further coupled to the branch reservation queue 112, execution pipe reservation queues 114A, 114B, 114C, 114D, and load/store reservation queue 116. Branch reservation queue 112 is coupled to branch execution unit 118. Execution pipe reservation queues 114A, 114B, 1146, 114D are each respectively coupled to corresponding execution pipes 120A, 120B, 120C, and 120D. Execution pipes 120A, 120B, 120C, and 120D are each coupled to provide output to stunt box 124. Each of execution pipes 120A, 120B, 120C, and 120D are respectively coupled to provide their output back to their inputs, and each is further coupled to the output of branch execution unit 118 to receive the SIN control signal. A memory 122 is coupled to the load/store unit 116. And load/store unit 116 is further coupled to a system bus 126.

Instruction cache 102 holds VLIW instructions that have been previously fetched by an instruction fetch unit (not shown). The VLIW instructions are typically fetched from a memory disposed external to the processor itself. Branch prediction unit 104 is shown coupled to instruction cache 102. Branch prediction unit 104 provides the address of the VLIW instruction to fetch. If the requested VLIW instruction is present in instruction cache 102 then it is provided to an instruction decoder 106. If the requested VLIW instruction is not present in instruction cache 102 then a cache miss has occurred and the requested instruction is fetched from a memory that is disposed outside of the processor.

Branch prediction unit 104 has several functions, including providing the program counter value needed by instruction cache 102, and the program counter value needed by different stages and logic blocks throughout the processor. For sequentially executing program code, the program counter value simply changes by the length of the instruction just fetched. But when a branch instruction is detected, then branch prediction unit 104 determines what from what address the next instruction should be fetched. In this exemplary processor, branch prediction unit 104 uses a small reset DHL Gshare branch prediction mechanism to determine the next instruction address.

Instruction decoder 106 decodes the content of the VLIW instructions and provides control information to various other blocks of the processor.

Register file 108 contains a predetermined number of programmer-visible registers. These registers hold values that are used during the execution of a program.

Individual instructions obtained from the VLIW instruction are enqueued into a selected reservation queue. When the operands needed for execution of an enqueued instruction become available, that instruction is issued to the execution pipe associated with the selected reservation queue.

Generation renamer 110 is used to assign generation numbers to register instances in instructions when those register instances would conventionally be reassigned to a different non-programmer-visible physical register.

The reservation queues hold instructions that are waiting to be issued.

Stunt box 124 provides a mechanism for receiving and distributing the outputs of the execution pipes. Stunt box 124 provides data to an operand copy network. The operand copy network allows all the results of the execution pipes to be made available to other blocks within the processor. In this way, an instruction waiting for an operand to be produced from the execution of another instruction does not have to wait for that operand to be written back to the register file and then read out of the register file. Rather the required operand is made available, via the operand copy network, to all the locations throughout the processor that are waiting for that particular result.

System bus 126 provides a mechanism for the embedded processor to communicate with other logic blocks on the integrated circuit that are external to the processor itself.

Resource Locking Overview

In addition to using the same registers, instructions within a program often specify the use of the same resources. Resources can include, but are not limited to, specific registers, for example Multiply-and-Accumulate (MAC) registers, or memory, for example each bank of a memory array. In an embodiment, some or all of these types of resources can be accessed concurrently. In an embodiment, there can be limitations associated with different resources, for example a MAC cannot be written to by two instructions as the same time or two instructions can only write to the same memory bank at the same time if they are writing to different addresses or different bits within the same address.

In an embodiment, for instructions that update resources, logic circuitry may be used to determine when the physical resource can be updated at any time. For an instruction that updates a MAC register, the processor's control logic may evaluate other pending instructions that update MAC registers. If any older pending instruction updates the same MAC register, this instruction may need to stall before attempting to make an update to the MAC register.

In an embodiment, each time an instruction that updates a resource is fetched and enqueued, the state information for that instruction can be set with regard to all pending instructions that update resources. This state can be maintained between processor clock cycles.

In an embodiment, for each cycle in which one or more instructions are enqueued that update resources, the processor can identify any instructions that are resource independent. In an embodiment, an instruction that can execute without conflicting with any other pending or executing instructions is resource independent. In an embodiment, an instruction that is resource independent is an instruction that does not update the same resource as any older enqueued instruction. For example, if an instruction is a MAC instruction and updates MAC3, the processor would identify that instruction as resource independent if no older enqueued instructions also updated MAC3. Otherwise the instruction will be identified as being dependent on the same resource as an older instruction until all resource dependencies are cleared.

In an embodiment, the processor can identify all instructions that are resource independent. This list represents all the instructions that could possibly issue in this cycle. The processor can then select one or more instructions from the queue to be issued. In an embodiment, the processor can select based on the position of the instruction, for example selecting older instructions before younger instructions. In an embodiment, the processor can select based on the number of resources updated, for example selecting instructions that update more resources over those that update fewer (possibly because more instructions will be held up by those instructions). The processor can select instructions to issue from the set of resource-independent instructions based on the type of operations performed by the instructions. For example, the processor may allow extra instructions to issue depending on how the processor is designed (e.g., if the processor can issue 2 MAC instructions, but only one predicate update instruction, and both MACs and predicates are resources, then the processor may prefer to issue MAC instructions over predicate update instructions).

In an embodiment, the Load/Store (L/S) unit can be divided into two parts. Once a L/S instruction is fetched it is placed in the first portion of the L/S unit. The instruction will remain in the first portion of the L/S unit until it is ready to execute. For load instructions, once the memory address where information is being loaded from has been determined, the instruction is ready to execute. For store instructions, once a value being stored and the memory address where the value is being, stored have been determined, the instruction is ready to execute.

Once a L/S instruction is ready to execute it is moved from the first portion of the L/S unit to the top of the queue of instructions in the second portion of the L/S unit. In an embodiment, each L/S instruction within the second portion of the L/S unit is associated with additional state information that can be used to select one or more instructions to issue.

In an embodiment, the state information includes state regarding whether the operands for a store instruction are speculative or not. Store instructions change memory. Changes to memory can be difficult to undo or roll back. Thus, in some embodiments, store instructions are not executed, and changes are not made to memory, until the processor is certain that the the correct operands are available to execute the store instruction.

In an embodiment, the state information can indicate the relation of a L/S instruction with other L/S instructions, specifically whether it can issue or whether it is blocked from issuing by one or more other L/S instructions in the L/S unit. For example, if there are three L/S instructions currently in the L/S unit, when a new L/S instruction is added to the second portion of the L/S unit, the state information for the new L/S instruction will contain state information with regard to each of the three older L/S instructions.

In an embodiment, the state information can include an indication of whether a L/S instruction is ready to issue. For any given cycle, multiple L/S instructions may be ready to issue. Once all L/S instructions within the L/S unit are analyzed, one or more L/S instructions are selected to issue from the L/S instructions that indicate they are ready to issue. In an embodiment, the oldest ready-to-issue L/S instructions can be selected. In another embodiment, ready-to-issue load instructions can be selected before ready-to-issue store instructions. Other methods of selecting and issuing L/S instructions may be used in accordance with processor and system design trade-offs.

In an embodiment, the state information can indicate the relation between the addresses of two L/S instructions. In an embodiment, the state information can indicate four states—independent, mutually exclusive, mergeable, and clash. In the divided L/S unit embodiment described above, as each L/S instruction is moved from the first portion of the L/S unit to the second portion of the L/S unit its state information can be generated with respect to every other instruction currently in the L/S unit. This generated state information can be maintained until the L/S instruction is issued, and can be updated as other L/S instructions are issued ahead of it.

In an embodiment, if a L/S instruction is marked as independent of an older instruction, it means that the two instructions can each issue if ready. In an embodiment, an instruction may be marked as independent of another instruction, with respect to a memory resource, if the execution of each instruction accesses different memory resources. For example, if the memory array has 4 banks, each of which can be read or written, independent of the other memory banks, then two instructions that read or write to different memory banks would be marked as independent.

In an embodiment, if a L/S instruction is marked as mutually exclusive of an older instruction, it means that either instruction could issue if both are ready, but that both could not issue in the same cycle. Thus, if both were ready to issue during the same cycle, the younger one could issue, the older one could issue, but both could not issue together. In the above example where the memory array has four independent memory banks, if execution of each instruction would read from or write to the same bank, but different indexes within that bank, either instruction could execute when ready, but both could not execute together since each memory bank could only be written to or read from once in a single cycle.

In an embodiment, if a L/S instruction is marked as mergeable with an older instruction, it means that the younger instruction can execute with or after the older instruction, but not before. Thus, if the younger instruction is ready to be issued, it can issue during the same cycle as the older instruction, or any cycle thereafter, but cannot issue if the older instruction has not issued or been selected to issue. For example, where the memory array has four independent memory banks, if both instructions are store instructions and execution of each writes to one or more same memory locations (for example if they both have an overlapping byte that they write to), the younger instruction would be marked as mergeable. In this example, if the older instruction was able to issue, but not the younger instruction, there would be no problem. But the younger instruction must wait for the older instruction to execute, or else the overlapping byte might end up with the wrong value (the value from the older instruction that will issue in the future, rather than the younger instruction that is ready to issue). And if both instructions are ready to issue, they can issue concurrently. The value of the overlapping byte can be set to the value that the younger instruction would store to that location.

In an embodiment, if a L/S instruction is marked as clash with an older instruction, it means that the younger instruction must issue after the older instruction. For example, in the above example where the memory array has four independent memory banks, if the older instruction is a store and the younger instruction is a load, and they both access at least one identical location in memory, then the younger instruction must wait for the older instruction to issue before being issued itself. If the younger load issues before the older store, it will retrieve the wrong value for any overlapping locations.

Below is an example of how L/S instructions may be tracked within the L/S unit, along with their associated status indications. The below example uses a simplified memory structure in order to illustrate the above conditions and relations. This example uses the four bank memory example, used above, where each bank includes a number of indexes (i.e., rows), as illustrated below.

|  | B0 | B1 | B2 | B3 |
|---|---|---|---|---|
| Index 0 | | | | |
| Index 1 | | | | |
| Index 2 | | | | |
| Index 3 | | | | |
| Index 4 | | | | |
| Index 5 | | | | |
| Index 6 | | | | |
| Index 7 | | | | |

In this example, at time 1, a store instruction is moved to the L/S unit. This store instruction stores data to both bank 0 and 1 at index 3. Because there are no other instructions in the L/S unit at the moment in this example, its status is clear. In addition, the ready status is clear, indicating that this instruction is currently speculative. In the below examples, we will use the following convention to describe the L/S instructions—St [R0], R1$_{I\,3,\,B0/1}$. In this convention "St" is the instruction—"St" for Store or "Ld" for load. "[R0]", i.e., the first operand, is the destination. In this example, the "[ ]" indicate that the destination is the address pointed to by R0. For example, if R0 was 0x00010000, this instruction would eventually store a value to address 0x00010000 in memory. "R1," i.e., the second operand, is the source. In this example, this is the value that will be stored in the address pointed to by R0.

| | Time 1: | | | | | |
|---|---|---|---|---|---|---|
| | Ready | 0 | 1 | 2 | 3 | Issue |
| St [R0], R1$_{I3,B0/1}$ | | | | | 0.St | |

At time 2, a second store instruction is moved to the L/S unit. This store instruction also stores data to bank 0, but at index 1. The processor then updates the status of this instruction relative to all existing instructions. This instruction is not speculative, so it is ready to be evaluated. Because this instruction writes to the same memory bank as the first store instruction, but to different indexes, the instructions are mutually exclusive. Either one can execute at any time relative to the other one, but they cannot execute at the same time.

Time 2:

| | Ready | 0 | 1 | 2 | 3 | Issue |
|---|---|---|---|---|---|---|
| St [R2], R3$_{I1,B0/0}$ | Y | 1.St | ME | | | |
| St [R0], R1$_{I3,B0/1}$ | | 0.St | | | | |

At time 3, a load instruction is moved to the L/S unit. This load instruction retrieves information from bank 1 at index 3. At least one portion of the memory accessed by this load instruction matches the memory written to by the first store instruction. As this instruction is moved into the L/S unit, the processor updates the status of this instruction relative to all existing instructions. Load instructions are always ready to be evaluated. Because this instruction reads from to the same memory bank as the first store instruction, with the same index, and there is a memory overlap, the instructions clash. Either one can execute at any time relative to the other one, but they cannot execute at the same time. Because this instruction reads from a different bank than the second instruction, the instructions are independent of each other. Thus, the state looks like:

Time 3:

| | Ready | 0 | 1 | 2 | 3 | Issue |
|---|---|---|---|---|---|---|
| Ld R4, [R5]$_{I3,B1/1(match\ St\ R0)}$ | Y | 2.Ld | C | I | | |
| St [R2], R3$_{I1,B0/0}$ | Y | 1.St | ME | | | |
| St [R0], R1$_{I3,B0/1}$ | | 0.St | | | | |

At time 4, a third store instruction is moved to the L/S unit. This store instruction writes information to bank 1 at index 3. No portions of the addresses of this store instruction overlap the previous load instruction. As this instruction is moved into the L/S unit, the processor updates the status of this instruction relative to all existing instructions. This store instruction is not speculative, so it is ready to be evaluated. Because this instruction writes to the same memory bank and index as the first store instruction, the instructions can be merged. This instruction can execute at the same time as the first store instruction or any time thereafter. This instruction writes to a different bank than the second instruction, so the instructions are independent of each other. Because this instruction writes to the same memory bank as the load instruction, with the same index, but there is no memory overlap, the instructions are mutually exclusive.

Time 4:

| | Ready | 0 | 1 | 2 | 3 | Issue |
|---|---|---|---|---|---|---|
| St [R6], R7$_{I3,B1/1(no\ match\ Ld\ R4)}$ | Y | 3.St | M | I | ME | |
| Ld R4, [R5]$_{I3,B1/1(match\ St\ R0)}$ | Y | 2.Ld | C | I | | |
| St [R2], R3$_{I1,B0/0}$ | Y | 1.St | ME | | | |
| St [R0], R1$_{I3,B0/1}$ | | 0.St | | | | |

At time 5, a second load instruction is moved to the L/S unit. This load instruction retrieves information from bank 1 at index 3. No portions of the addresses of this load instruction overlap the first store instruction but portions do overlap with the third store instruction. As this instruction is moved into the L/S unit, the processor updates the status of this instruction relative to all existing instructions. Load instructions are always ready to be evaluated. Because this instruction reads from the same memory bank as the first store instruction, with the same index, but there is no memory overlap, the instructions are mutually exclusive. This instruction loads from a different bank than the second store instruction, so the instructions are independent of each other. The first and second load instructions read from the same index and the same banks. Thus, the instructions are independent of each other. Nothing prevents one from executing before the other. Because this instruction reads from the same memory bank as the third store instruction, with the same index, and there is a memory overlap, the instructions clash.

Time 5:

| | Ready | 0 | 1 | 2 | 3 | Issue |
|---|---|---|---|---|---|---|
| Ld R8, [R9]$_{I3,B1/1(No\ match\ St\ R0,match\ St\ R6)}$ | Y | 4.Ld | ME | I | I | C |
| St [R6], R7$_{I3,B1/1(no\ match\ Ld\ R4)}$ | Y | 3.St | M | I | ME | |
| Ld R4, [R5]$_{I3,B1/1(match\ St\ R0)}$ | Y | 2.Ld | C | I | | |
| St [R2], R3$_{I1,B0/0}$ | Y | 1.St | ME | | | |
| St [R0], R1$_{I3,B0/1}$ | | 0.St | | | | |

In an embodiment, once the memory becomes available, for example when the system bus is available, the processor can analyze the pending L/S instruction in the L/S unit to determine which instructions are ready to be issued. In an embodiment, the L/S instructions are analyzed from the oldest to the youngest, and each instruction is identified as either ready to issue or not. In an embodiment, the ready to issue can include additional information (for example ready to issue, ready to issue with Inst X, or ready to issue if Inst X does not issue) regarding the issue status of other instructions in the L/S unit. This is important for mergeable and mutually exclusive instructions.

Continuing with the example from above, if at time 6, the processor is able to access memory, it must determine which L/S instruction or instructions it will execute. Thus, it begins evaluating the ready instructions. At the beginning of time 6, the L/S unit looks like this:

Time 6:

| | Ready | 0 | 1 | 2 | 3 | Issue |
|---|---|---|---|---|---|---|
| Ld R8, [R9]$_{I3,B1/1(No\ match\ St\ R0,match\ St\ R6)}$ | Y | 4.Ld | ME | I | I | C |
| St [R6], R7$_{I3,B1/1(no\ match\ Ld\ R4)}$ | Y | 3.St | M | I | ME | |
| Ld R4, [R5]$_{I3,B1/1(match\ St\ R0)}$ | Y | 2.Ld | C | I | | |
| St [R2], R3$_{I1,B0/0}$ | Y | 1.St | ME | | | |
| St [R0], R1$_{I3,B0/1}$ | | 0.St | | | | |

In an embodiment, the instructions that are ready to be evaluated in the second portion of the L/S unit are evaluated from the oldest to the youngest. Because the first store instruction is not ready to be evaluated, it cannot issue. The processor is able to temporarily modify all the instructions that were mutually exclusive with the first instruction to indicate that they are now independent of the first store instruction. Thus, the second store instruction and the second load instruction can now issue, assuming no other instructions block them.

Next, the second store instruction is evaluated. The second store is ready to be evaluated. It is mutually exclusive with regard to the first store. Because the first store is not issuing, the status can be temporarily modified to Independent. Modifications to the status are temporary and an status changes are backed out when the cycle is over. There are no other state determinations to be evaluated, so the second store can be marked as ready to Issue.

| Time 6: | | | | | | |
|---|---|---|---|---|---|---|
| | Ready | 0 | 1 | 2 | 3 | Issue |
| Ld R8, [R9]$_{I3,B1/1(No\ match\ St\ R0,match\ St\ R6)}$ | Y | 4.Ld | ME > I | I | I | C |
| St [R6], R7$_{I3,B1/1(no\ match\ Ld\ R4)}$ | Y | 3.St | M | | I ME | |
| Ld R4, [R5]$_{I3,B1/1(match\ St\ R0)}$ | Y | 2.Ld | C | I | | |
| St [R2], R3$_{I1,B0/0}$ | Y | 1.St | ME > I | | | Y |
| St [R0], R1$_{I3,B0/1}$ | | 0.St | | | | |

Next, the first load instruction is evaluated. The first load instruction is ready to be evaluated. It clashes with regard to the first store. Because the first store has not issued yet, this load cannot issue. The first load is independent of the second store instruction. But, it cannot issue until after the first store instruction issues. Thus, it is not ready to issue.

Next, the third store instruction is evaluated. The third store instruction is ready to be evaluated. It can be merged with the first store instruction. Thus, it could issue with or after the first store instruction, but because the first store instruction has not issued yet, and will not issue this cycle, the third store instruction also cannot issue. This is the case, even though it is independent of the second store instruction and mutually exclusive of the first load instruction that is not ready to issue. Thus, the third store instruction is not ready to issue.

| Time 6: | | | | | | |
|---|---|---|---|---|---|---|
| | Ready | 0 | 1 | 2 | 3 | Issue |
| Ld R8, [R9]$_{I3,B1/1(No\ match\ St\ R0,match\ St\ R6)}$ | Y | 4.Ld | ME > I | I | I | C |
| St [R6], | Y | 3.St | M | | I ME > I | |
| R7$_{I3,B1/1(no\ match\ Ld\ R4)}$ Ld R4, | Y | 2.Ld | C | I | | |
| [R5]$_{I3,B1/1(match\ St\ R0)}$ St [R2], R3$_{I1,B0/0}$ | Y | 1.St | ME > I | | | Y |
| St [R0], R1$_{I3,B0/1}$ | | 0.St | | | | |

Next, the second load instruction is evaluated. The second load instruction is ready to be evaluated. It is mutually exclusive of the first store instruction. The first store instruction is not ready to issue, so there is no conflict with the first store instruction. The second load instruction can execute independent of the second store instruction and the first load instruction so there is also no conflicts with either of these instructions. But the second load instruction reads from the same index and same bank as the third store instruction writes to, and there is a portion of the load that overlaps with the store, so the instructions clash. The second load instruction cannot issue until after the third store instruction.

Next, having completed the evaluation, the processor can select an instruction to issue. In this case, the only instruction that is ready to issue is the second store instruction, and thus, it issues.

Continuing with the example from above, if at time 7, the processor is able to access memory, it must determine which L/S instruction or instructions it will execute. At this point the first store instruction is no longer speculative and is ready to be evaluated. At the beginning of time 6, the L/S unit looks like this:

| Time 7: | | | | | | |
|---|---|---|---|---|---|---|
| | Ready | 0 | 1 | 2 | 3 | Issue |
| Ld R8, [R9]$_{I-3,T1/1(No\ match\ St\ R0,match\ St\ R6)}$ | Y | 3.Ld | ME | I | C | |
| St [R6], | Y | 2.St | M | ME | | |
| R7$_{I-3,T1/1(no\ match\ Ld\ R4)}$ Ld R4, | Y | 1.Ld | C | | | |
| [R5]$_{I-3,T1/1(match\ St\ R0)}$ St [R0], R1$_{I-3,T0/1}$ | Y | 0.St | | | | |

At this point, the first store instruction is ready to be evaluated. Because there are no older instructions with which it can conflict, it is ready to issue. The processor is able to temporarily modify all the instructions that were mergeable with the first instruction to indicate that they are now independent of the first store instruction, i.e., they can execute with the first instruction assuming there are no other conflicts. Thus, the second store instruction is modified to indicate that it is independent of the first store instruction.

| Time 7: | | | | | | |
|---|---|---|---|---|---|---|
| | Ready | 0 | 1 | 2 | 3 | Issue |
| Ld R8, [R9]$_{I-3,T1/1(No\ match\ St\ R0,match\ St\ R6)}$ | Y | 3.Ld | ME | I | C | |
| St [R6], | Y | 2.St | M > I | ME | | |
| R7$_{I-3,T1/1(no\ match\ Ld\ R4)}$ Ld R4, | Y | 1.Ld | C | | | |
| [R5]$_{I-3,T1/1(match\ St\ R0)}$ St [R0], R1$_{I-3,T0/1}$ | Y | 0.St | | | | Y |

Next, the first load instruction is ready to be evaluated. Because if conflicts with the first store instruction it cannot issue until the first store instruction has issued. Thus, it is not ready to issue. The processor is able to temporarily modify all the instructions that were mutually exclusive of the first load instruction to indicate that they are now independent of the first store instruction, i.e., they can execute since the first load instruction is not executing assuming there are no other conflicts. Thus, the second store instruction is modified to indicate that it is independent of the first load instruction.

Next, the second store instruction is ready to be evaluated. Due to the state changes discussed above, the second store machine can issue, assuming that the first store instruction issues. This is because the state initially indicated that they were mergeable, i.e., the second store can either issue after or with the first store instruction.

Last, the second load instruction is ready to be evaluated. Because it is mutually exclusive of the first instruction and the first instruction is ready to issue, it cannot issue. In addition, the second load instruction clashes with the second store instruction, so it cannot issue until after the second store instruction.

At this point all pending instructions in the L/S queue have been evaluated. The two store instructions are ready to issue. Depending on the implementation of the memory system, one or more L/S instructions can execute at this point. For example, the memory system can be designed to handle only one L/S instruction per cycle, multiple L/S instructions per cycle, or some combination of load and store instructions (e.g., 1 load instruction and 2 store instructions each cycle.)

| Time 7: | | | | | | |
|---|---|---|---|---|---|---|
| | Ready | 0 | 1 | 2 | 3 | Issue |
| Ld R8, [R9]$_{I-3,T1/1(No\ match\ St\ R0,match\ St\ R6)}$ | Y | 3.Ld | ME | I | C | |
| St [R6], R7$_{I-3,T1/1(no\ match\ Ld\ R4)}$ | Y | 2.St | M > I | ME > I | | Y |
| Ld R4, [R5]$_{I-3,T1/1(match\ St\ R0)}$ | Y | 1.Ld | C | | | |
| St [R0], R1$_{I-3,T0/1}$ | Y | 0.St | | | | Y |

For this example, let us assume that the memory system has been designed to handle 2 L/S instructions per cycle. This could be 2 load instructions, 2 store instructions, or 1 load and 1 store instruction. Having identified that both store instructions can be issued, the processor may issue both of them this cycle. In an embodiment, once an instruction is issued it may be removed from the L/S unit, all dependencies related to this instruction may be changed to independent, and the remainder of the state table may stay the same. In an embodiment, the state table may remain the same until it a L/S instruction is put in its last entry, at which time it may consolidate the table to remove entries that have issued. In an embodiment, once an instruction is issued, not only will it be removed, but all remaining entries in the table can be shifted accordingly.

In this example, for simplicity sake, we will assume that the state table is collapsed each time a L/S instruction is issued. At the beginning of time 8, having issued the store instructions, the state table may look like:

| Time 8: | | | | | | |
|---|---|---|---|---|---|---|
| | Ready | 0 | 1 | 2 | 3 | Issue |
| Ld R8, [R9]$_{I-3,T1/1}$ | Y | 1.Ld | I | | | |
| Ld R4, [R5]$_{I-3,T1/1}$ | Y | 0.Ld | | | | |

At this point, if additional L/S instructions are ready to be evaluated they can be moved to the L/S unit and the state table can be updated as described above. If the processor is able to access memory, then these two load instructions may issue (i.e., both are ready to issue, and the second load can execute independent of the first load instruction, so both would be ready to issue).

Resource Locking Structure

Figure 2:
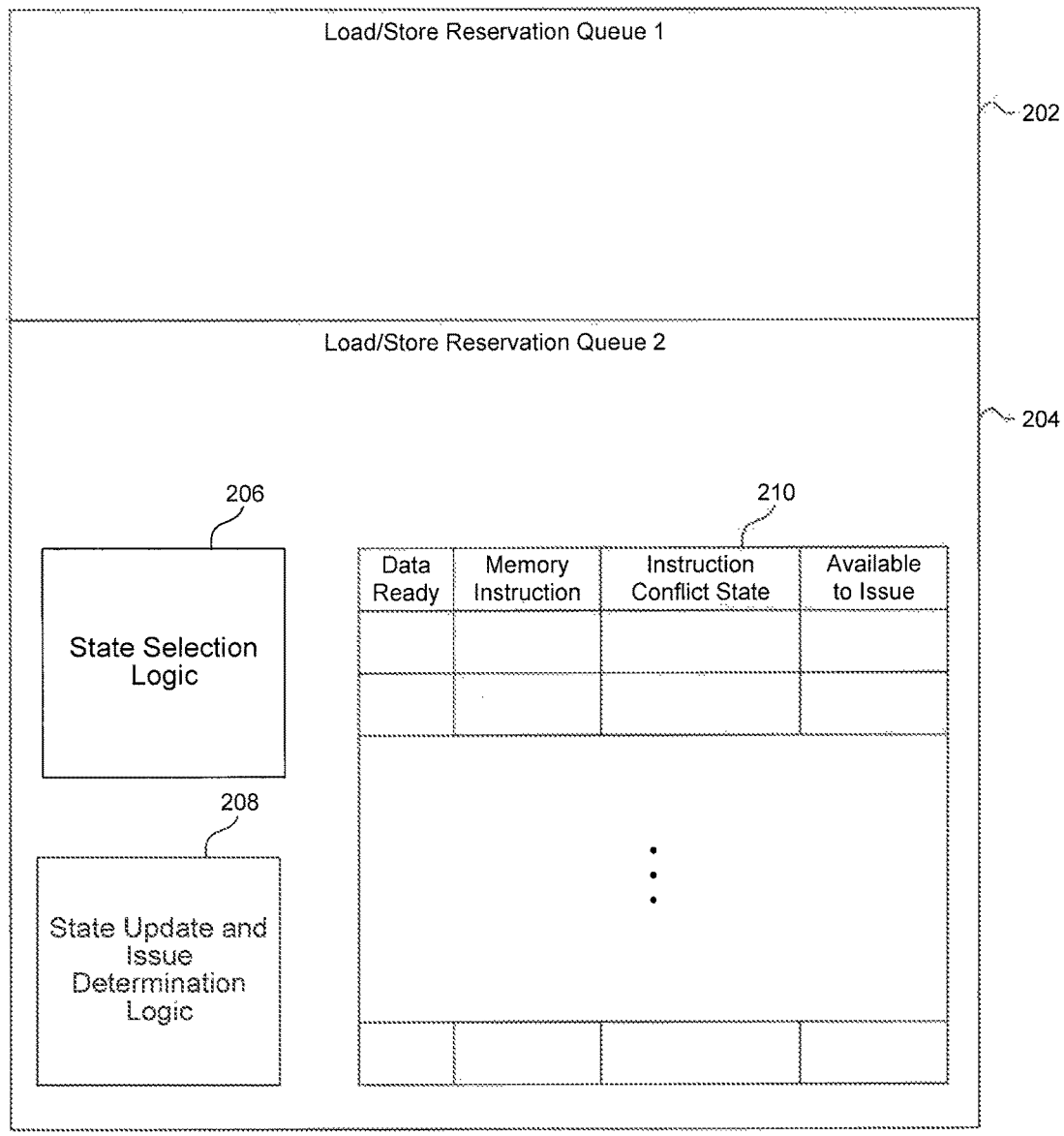
FIG. 2 is a high-level block diagram of an exemplary processor with resource locking.

Referring to FIG. 2, an exemplary embodiment of a Load/Store (L/S) Queue includes a L/S Reservation Queue 1 202 and a L/S Reservation Queue 2 204.

L/S Reservation Queue 1 202 can be the first portion of the L/S unit described above. When a L/S instruction is fetched, it is first placed in L/S Reservation Queue 1 202. Once the L/S instruction's operands are resolved it can be placed in L/S Reservation Queue 2 204. Load instructions take data from a location in memory and load it to a destination, typically a register. Thus, for load instructions, all that needs to be resolved is the location in memory. For store instructions, a value, typically stored in a register, is stored to a memory location. Thus, for a store instruction to be moved to L/S Reservation Queue 2 204 both the value to be stored and the location where the value is to be stored must be resolved.

L/S Reservation Queue 2 204 can be the second portion of the L/S unit described above. L/S Reservation Queue 2 204 includes a State Selection Logic 206, State Update and Issue Determination Logic 208, and L/S Instruction State Queue 210. As described above, when a L/S instruction is received into L/S Reservation Queue 2 204 it is placed in L/S Instruction State Queue 210.

In an embodiment, when a L/S instruction is placed in L/S Instruction State Queue 210, State Selection Logic 206 determines the initial state of the instruction in view of all other L/S instructions currently pending in L/S Reservation Queue 2 204. As described above, in an embodiment, State Selection Logic 206 sets that initial state of each L/S instruction. State Selection Logic 206 indicates whether store instructions are speculative or not. For those store instructions that are speculative, State Selection Logic 206 puts them into L/S Instruction State Queue 210 but sets the Data Ready state to "No." For all other L/S instructions, State Selection Logic 206 sets the Data Ready state to "Yes." As described above, State Selection Logic 206 also sets the initial Instruction Conflict State. This state allows State Update and Issue Determination Logic 208 to determine whether an instruction can issue based on the memory read from and written to by previous L/S instructions.

In an embodiment, State Update and Issue Determination Logic 208 determines whether instructions are ready to issue, selects instructions to issue, and updates L/S Instruction State Queue 210 when instructions issue. As described above, when a L/S instruction's operands are ready, State Update and Issue Determination Logic 208 analyzes the Instruction Conflict State and the issue status of prior L/S instructions to determine if the L/S instruction is ready to issue. Once all instructions in L/S Reservation Queue 2 204 have been analyzed, State Update and Issue Determination Logic 208 selects instructions to be issued. It may prefer to issue older instructions rather than newer instructions, store instructions rather than load instructions, instructions that read from or write to specific areas in memory, etc.

In an embodiment, L/S Instruction State Queue 210 maintains the state of all L/S instructions in L/S Reservation Queue 2 204. In an embodiment, L/S Instruction State Queue 210 comprises a Data Ready indicator that indicated whether or not the instruction can execute. For example, store instructions that are speculatively fetched cannot issue. Because they affect memory, issuing a store instruction cannot easily be backed out. Thus, these instructions will be maintained in L/S Instruction State Queue 210 until they are no longer speculative. In an embodiment, L/S Instruction State Queue 210 comprises the Memory Instruction itself or a pointer to the memory instruction. This allows the processor to issue the instruction once it is ready. In an embodiment, L/S Instruction State Queue 210 comprises the Instruction Conflict State that maintains the relation between L/S instructions. In an embodiment, once the Instruction Conflict State is set for any given instruction it can be maintained until that instruction issues. Thus, it does not need to be recalculated each time the processor has access to the memory. In an embodiment, L/S Instruction State Queue 210 comprises an Available to Issue indication. This indication allows L/S Reservation Queue 2 204 to track which instructions are available to issue each cycle. Thus, once the processor has access to the memory it may select one or more L/S instructions to execute.

State Selection Process

In an exemplary embodiment, the L/S unit can be configured to determine the relation between a new L/S instruction and all pending L/S instructions.

Figure 3:
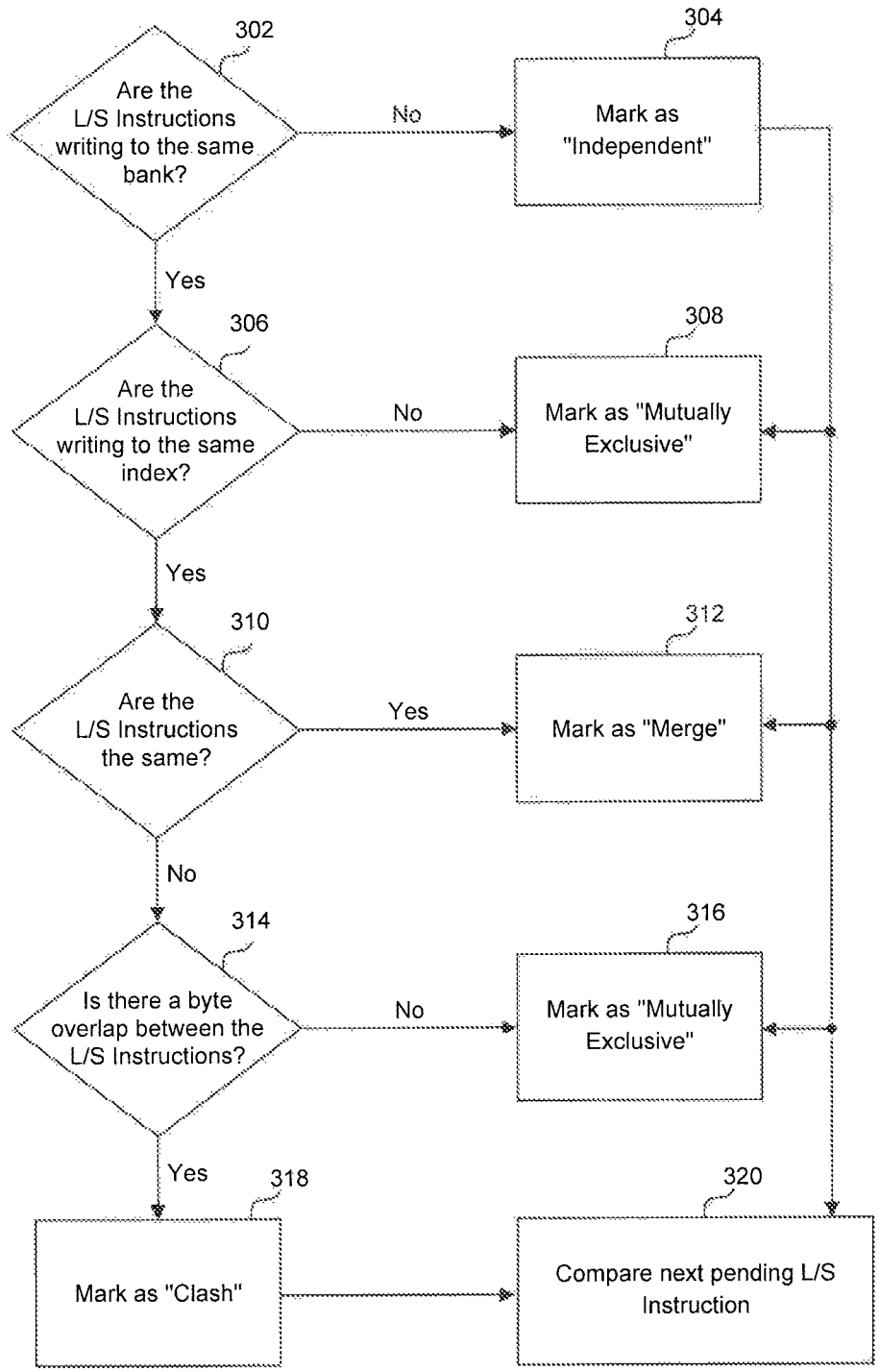
FIG. 3 is flowchart illustrating a state determination process, according to an example embodiment.

The process illustrated in FIG. 3 describes how the L/S unit compares the new L/S instruction with a pending L/S instruction.

At step 302, the L/S unit determines if the new L/S instruction writes to the same block as the pending L/S instruction.

If not, the instructions are independent, as described above, and the process moves on to step 304. At step 304, the L/S unit sets the state relating to the new L/S instruction and the pending L/S instruction to "independent" and continued to step 320.

If the new L/S instruction and the pending L/S instruction write to the same block, then the process moves on to step 306. At step 306, the L/S unit determines if the new L/S instruction is writing to the same index as the pending L/S instruction.

If not, the instructions are mutually exclusive, as described above, and the process moves on to step 308. At step 308, the L/S unit sets the state relating to the new L/S instruction and the pending L/S instruction to "mutually exclusive" and continued to step 320.

If the new L/S instruction and the pending L/S instruction write to the same index, then the process moves on to step 310. At step 310, the L/S unit determines if the new L/S instruction and the pending L/S instruction are the same type of operation, i.e., are they both load instructions or are they both store instructions.

If so, the instructions can be merged, as described above, and the process moves on to step 312. At step 312, the L/S unit sets the state relating to the new L/S instruction and the pending L/S instruction to "mergeable" and continues to step 320.

If the new L/S instruction and the pending L/S instruction are different types of operations, i.e., one is a load instruction and the other is a store instruction, then the process moves on to step 314. At step 314, the L/S unit determines if the new L/S instruction and the pending L/S instruction access at least one overlapping byte, i.e., both operations access the same bits of storage in the memory.

If not, the instructions are mutually exclusive, as described above, and the process moves on to step 316. At step 316, the L/S unit sets the state relating to the new L/S instruction and the pending L/S instruction to "mutually exclusive" and continues to step 320.

If so, the instructions clash, as described above, and the process moves on to step 318. At step 318, the L/S unit sets the state relating to the new L/S instruction and the pending L/S instruction to "clash" and continues to step 320.

At step 320, the next pending L/S instruction is selected and the process can begin again to determine the state relating to the new L/S instruction and new newly selected pending L/S instruction.

State Update and Issue Process

In an exemplary embodiment, the L/S unit can be configured to update the state relations between the pending L/S instructions and identify L/S instructions that are ready to issue.

Figure 4:
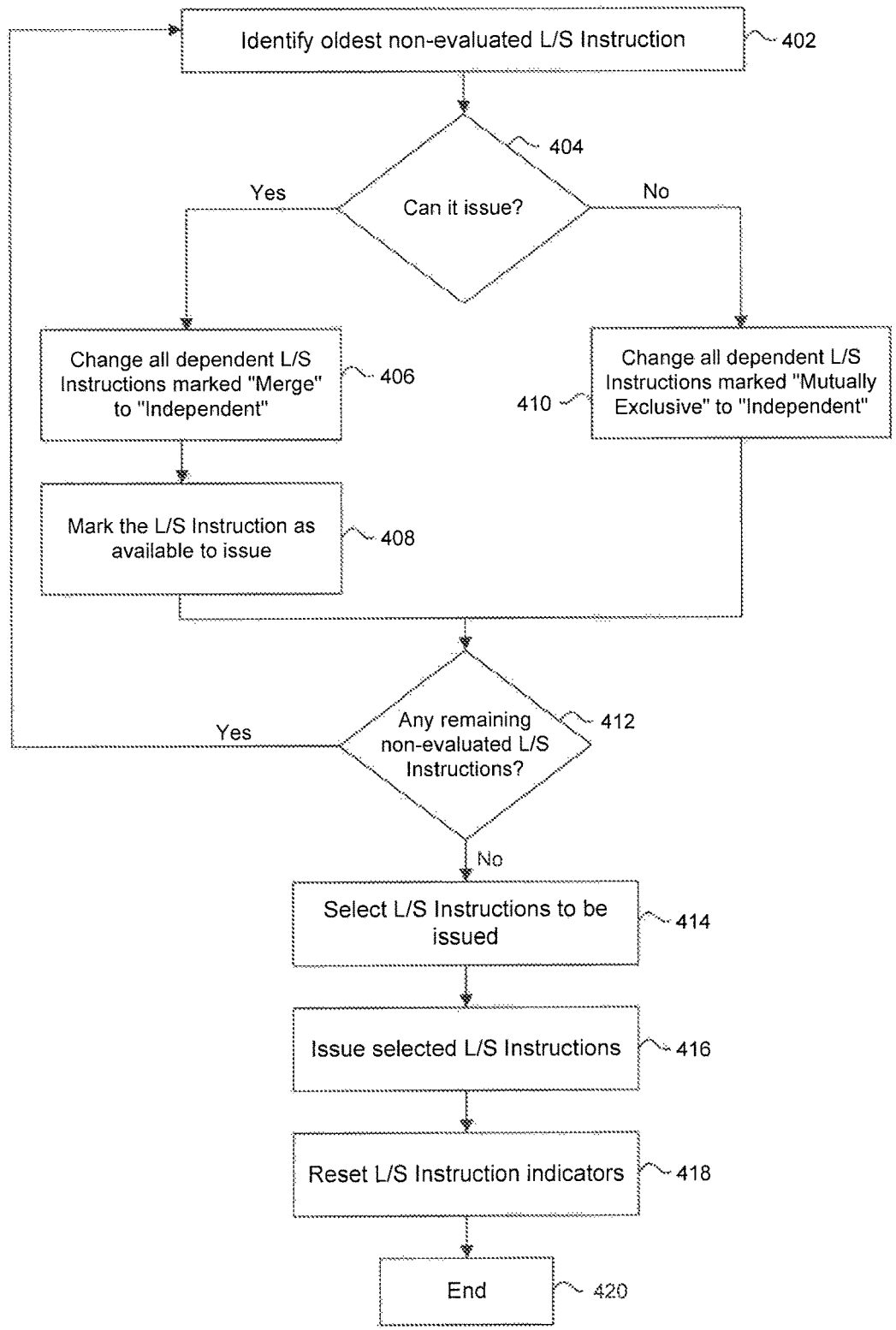
FIG. 4 is flowchart illustrating an instruction state update process, according to an example embodiment.

The process illustrated in FIG. 4 describes how the L/S unit updates the state relations and identifies instructions that are ready to be issued.

At step 402, the L/S unit identifies the oldest non-evaluated L/S instruction and beings evaluating it.

At step 404, the L/S unit determines if this instruction is ready to be issued. If the L/S instruction is a store instruction that is still speculative, then it is not ready to be issued. If any instruction conflict state associated with the L/S instruction is not currently set to "Independent" then the L/S instruction is not ready to issue. Otherwise this L/S instruction is ready to issue.

If the L/S instruction is ready to issue, then the process moves on to step 406. At step 406, the state for all younger instructions that is related to this instruction are identified. If any of the younger instruction state is currently set to "Merge," the state is temporarily set to "Independent." This is because the current L/S instruction is ready to issue and the younger L/S instruction indicated that it could issue if the current L/S instruction issued.

At step 408, the current L/S instruction is marked as ready to issue. The process then continues on to step 412.

If the current L/S instruction is not ready to issue, then the process moves on to step 410. At step 410, the state for all younger instructions that is related to this instruction are identified. If any of the younger instruction state is currently set to "Mutually Exclusive," the state is temporarily set to "Independent." This is because the current L/S instruction is not ready to issue and the younger L/S instruction indicated that it could issue if the current L/S instruction does not issue. The process then continues on to step 412.

At step 412, if there are any remaining L/S instructions to be evaluated, the process returns to step 402 to evaluate the remaining L/S instructions. Otherwise, the process continues to step 414.

At step 414, L/S instructions that are ready to be issued are selected. In an embodiment, the selection is based on the age of the L/S instruction, for example selecting older instructions first. In an embodiment, the selection is based on the type of L/S instruction, for example preferring to issue store instructions over load instructions. In an embodiment, the selection of instructions can be based on the design of the processor, for example factoring in the load and store bandwidth. A person skilled in the art would understand that other selection methods could be used.

At step 416, the selected L/S instructions are issued.

At step 418, the instruction conflict state for all the instructions in the second portion of the L/S unit is reset back to what it was before this process started, and the process ends at step 420.

CONCLUSION

It is to be appreciated that the Detailed Description section, and not the Abstract of the Disclosure, is intended to be used to interpret the claims. The Abstract of the Disclosure may set forth one or more, but not all, exemplary embodiments, and thus, is not intended to limit the disclosure and the subjoined Claims in any way.

It will be apparent to those skilled in the relevant art(s) that various changes in form and detail can be made therein without departing from the spirit and scope of the disclosure. Thus the disclosure should not be limited by any of the above-described exemplary embodiments, but should be defined only in accordance with the subjoined Claims and their equivalents.

What is claimed is:

1. A method, comprising:
    receiving, by a load/store queue, a memory instruction requiring a first memory resource;
    comparing, by a state-selection circuit, the memory instruction against an older memory instruction of a plurality of pending memory instructions stored in the load/store queue, and requiring a second memory resource;
    setting a state information for the memory instruction that includes information regarding respective states of the plurality of pending memory instructions when the memory instruction is moved from a first portion of a load/store unit to a second portion of the load/store unit; and setting a status, by the state-selection circuit, to indicate whether (i) the memory instruction can be performed independent of the older memory instruction; (ii) the memory instruction can be performed if the older memory instruction cannot be performed; (iii) the memory instruction can be performed concurrently with the older memory instruction; or (iv) the memory instruction must be performed, if at all, after the older memory instruction is performed, wherein the memory instruction is evaluated against other pending memory instructions in the load/store queue within a single processor clock cycle.

2. The method of claim 1, wherein the memory instruction and the older memory instruction are concurrently pending in the load/store queue.

3. The method of claim 1, wherein the memory instruction or the older memory instruction comprise load instructions or store instructions.

4. The method of claim 1, wherein the setting the status comprises setting the status when the memory instruction is received by the load/store queue in the second portion of the load/store unit.

5. The method of claim 1, wherein the memory instruction and the older memory instruction can be performed independently when the first memory resource and the second memory resource correspond to different memory banks.

6. The method of claim 1, wherein the memory instruction can be performed when the older memory instruction is not performed and the first and second memory resources specify a same memory bank, but different indices.

7. The method of claim 1, wherein the memory instruction can be performed when the older memory instruction is performed, the memory instruction and the older memory instruction include a same type of memory instruction, and the first and second memory resources correspond to a same memory bank and a same index.

8. The method of claim 1, wherein the memory instruction can be performed when the older memory instruction is not performed, the memory instruction and the older memory instruction include different types of memory operations, the first and second memory resources correspond to a same memory bank and a same index, and the first and second memory resources do not correspond to same memory bytes.

9. The method of claim 1, wherein the memory instruction can only be performed after the older memory instruction is performed when the memory instruction and the older memory instruction include different types of memory operations, the first and second memory resources correspond to a same memory bank and a same index, and the first and second memory resources correspond to at least one common memory byte.

10. An apparatus, comprising:
a memory queue configured to store a plurality of memory instructions and state information indicating whether each memory instruction of the plurality of memory instructions can be performed independently, with, separately, or after older pending memory instructions of the plurality of memory instructions; and
a state-selection circuit configured to set a respective state information for each memory instruction of the plurality of memory instructions in view of respective older pending memory instructions in the memory queue when each memory instruction is moved from a first portion of a load/store unit to a second portion of the load/store unit, wherein the respective state information includes information regarding respective states of older pending memory instructions, and
wherein a memory instruction of the plurality of memory instructions is evaluated against other older pending memory instructions of the plurality of memory instructions in the memory queue within a single processor clock cycle.

11. The apparatus of claim 10, wherein the plurality of memory instructions comprise load or store instructions.

12. The apparatus of claim 10, wherein the state-selection circuit generates the state information of the memory instruction in the single processor clock cycle.

13. The apparatus of claim 10, wherein the state-selection circuit is further configured to generate the state information when a new memory instruction is put into the memory queue in the second portion of the load/store unit.

14. The apparatus of claim 10, wherein the state-selection circuit is further configured to set an instruction-pair state information to indicate the plurality of memory instructions are independent if they do not correspond to same memory banks.

15. The apparatus of claim 10, wherein the state-selection circuit is further configured to set an instruction-pair state information to indicate that either instruction can be performed but not both if they correspond to a same memory bank with different indices.

16. The apparatus of claim 10, wherein the state-selection circuit is further configured to set an instruction-pair state information to indicate that a younger memory instruction can be performed with the older memory instruction if they correspond to a same memory bank and a same index and are a same type of instruction.

17. The apparatus of claim 10, wherein the state-selection circuit is further configured to set an instruction-pair state information to indicate that either memory instruction can be performed but not both concurrently if they correspond to a same memory bank and a same index, they are different operations, and they do not correspond to a common memory byte.

18. The apparatus of claim 10, wherein the state-selection circuit is further configured to set an instruction-pair state information to indicate that a younger instruction must be performed after the older instruction if they correspond to a same memory bank and a same index, they are different operations, and they correspond to a common memory byte.

19. A method, comprising:
identifying, by a state-update circuit, a first instruction that is an oldest non-evaluated pending memory instruction of a plurality of pending memory instructions;
determining, by the state-update circuit, whether the first instruction is currently eligible to be issued;
modifying, by the state-update circuit, a respective state for each remaining non-evaluated instruction of the plurality of pending memory instructions whose state indicated that they could be issued when the non-evaluated instruction is moved from a first portion of a load/store unit to a second portion of the load/store unit and when the first instruction issued to indicate that the plurality of pending memory instructions are independent if the determination is affirmative, wherein the respective state information includes information regarding respective states of respective older pending memory instructions; and marking, by a load/store unit control logic circuit, the first instruction as eligible to be performed if the determination is affirmative, wherein the first instruction is evaluated against the plurality of pending memory instructions within a single processor clock cycle.

20. The method of claim 19, further comprising:

modifying, by the state-update circuit, a state for each remaining non-evaluated instruction whose state indicated that it could be performed when the first instruction was not performed to indicate that the plurality of pending memory instructions are independent if the determination is affirmative.

21. The method of claim 19, further comprising selecting instructions to be performed from the plurality of pending memory instructions marked as eligible to be performed.

22. The method of claim 21, further comprising performing the selected instructions.

23. The method of claim 22, further comprising reverting the state for the pending instructions.

24. The method of claim 20, further comprising reverting the state for the pending instructions.

25. The method of claim 19, wherein the determining comprises determining that the oldest non-evaluated pending instruction does not conflict with any older pending memory instruction.

26. The method of claim 22, wherein the selecting is based on the instructions marked eligible to be performed.

27. The method of claim 22, wherein the state associated with selected instructions is cleared.

28. An apparatus, comprising:

a memory queue configured to store a plurality of memory instructions and state information indicating whether each memory instruction of the plurality of memory instructions is to issue independently, with, separately, or after older pending memory instructions of the plurality of memory instructions and if it is eligible to be performed; and a state-update circuit configured to update a state information for a first memory instruction of the plurality of memory instructions, when the first memory instruction is moved from a first portion of a load/store unit to a second portion of the load/store unit, indicating the relation between the first memory instruction and an older pending memory instruction of the plurality of memory instructions based on if the older pending memory instruction is eligible to be performed, wherein the state information includes information regarding respective states of every older pending memory instruction, and wherein the first memory instruction is evaluated against the older pending memory instructions in the memory queue within a single processor clock cycle.

29. The apparatus of claim 28, wherein the plurality of memory instructions comprises load instructions or store instructions.

30. The apparatus of claim 28, wherein the state-update circuit updates the state of the memory instruction in the single memory queue clock cycle.

31. The apparatus of claim 28, wherein the state-update circuit is further configured to determine if the first memory instruction is eligible to be performed.

32. The apparatus of claim 31, wherein the state-update circuit is further configured to determine if the first memory instruction is eligible to be performed by determining if it is independent of all older pending memory instructions.

33. The apparatus of claim 28, wherein the state-update circuit is further configured to select a memory instruction to perform from the plurality of memory instructions marked eligible to be performed.

34. The apparatus of claim 33, wherein the state-update circuit is further configured to revert the state of the pending memory instructions once the selected memory instruction issues.

35. The apparatus of claim 33, wherein the state-update circuit is further configured to clear all states associated with the selected instruction.

* * * * *